Aug. 12, 1958    J. H. KAUFFMAN ET AL    2,846,879
MATERIAL LEVEL CONTROLS
Filed Dec. 7, 1951
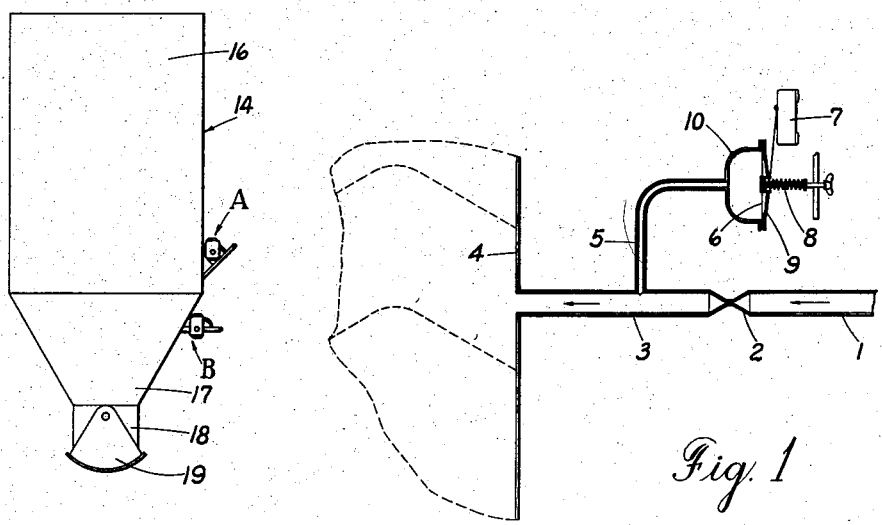
Fig. 1
Fig. 2
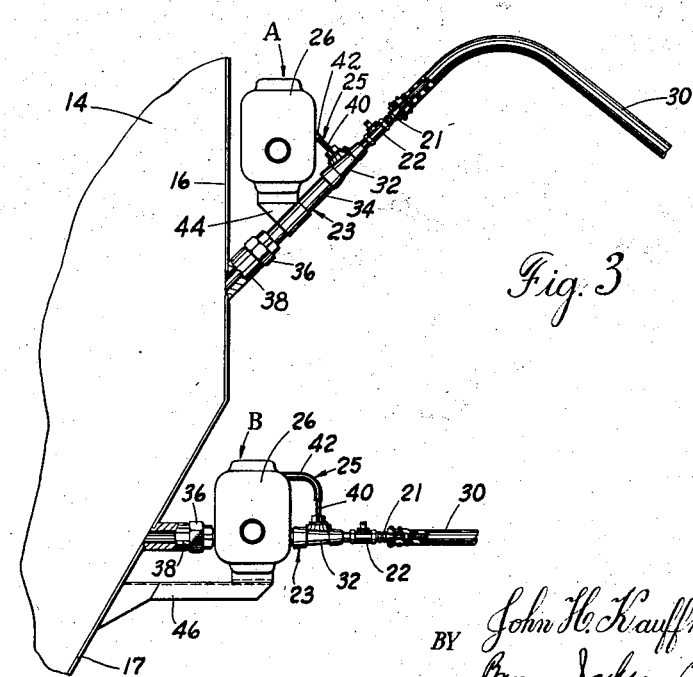
Fig. 3
INVENTOR.
John H. Kauffman & William F. Hope
BY Brown, Jackson, Boettcher & Dienner
ATTORNEYS.

2,846,879

MATERIAL LEVEL CONTROLS

John H. Kauffman, Elkhart, and William F. Hope, South Bend, Ind., assignors, by mesne assignments, to Studebaker-Packard Corporation, a corporation of Michigan Application December 7, 1951, Serial No. 260,474

4 Claims. (Cl. 73—302)

The present invention relates to control devices for sensing variations in level of materials in hoppers, or the like, and for indicating and/or remedying variations beyond a predetermined level.

An object of the present invention is to provide an improved control or sensing device adapted for association with a hopper or the like to sense variations, beyond a predetermined level, of solid materials received within the hopper.

Another object of the invention is to provide an improved control or sensing device wherein air is the sensing medium and the control functions of the device are accomplished by variations in air pressure within the device.

According to the present invention, we provide means for introducing a stream of air into a hopper or the like at a predetermined level, and a diaphragm in communication with the stream of air exteriorly of the hopper to sense and be actuated by variations in pressure in the stream. If the level of solid material within the hopper is below the stream of air, the diaphragm will not sense any pressure, but if the level is above the stream of air, flow of air will be blocked so that pressure builds up on the diaphragm to actuate same. Accordingly, as the material in the hopper rises above the air stream and falls below the air stream, a control force is exerted on the diaphragm to effect movement thereof. The diaphragm may be disposed to actuate indicating means and/or valve gates or the like to indicate the level of the material with respect to the air stream and/or to control the addition or removal of material to the hopper.

Further in accordance with the present invention, it is an object to provide a plurality of control devices of the character defined at various levels of a hopper or the like, so as to provide control limits for variations of level of material within the hopper.

It is also an object of the present invention to provide a control device of the character defined that is economical of manufacture and assembly and may be readily and conveniently associated with a hopper or the like.

Other objects and advantages of the present invention will become apparent from the following detailed description of a preferred embodiment of the invention, wherein reference is made to the accompanying drawings, in which:

Figure 1 is a somewhat schematic representation of the control device of the present invention associated with a hopper, the hopper being shown fragmentarily;

Figure 2 is a side elevation of a hopper and a plurality of devices of the present invention associated therewith; and Figure 3 is a side view, partly in section and partly in elevation, on an enlarged scale, of a portion of the hopper and the control devices shown in Figure 2.

Referring now to the drawings, and particularly to Figure 1, the control device of the present invention is shown schematically as including an inlet conduit 1, a variable restriction 2, a conduit 3 leading into a hopper 4, a conduit or lead 5 establishing communication between the conduit 3 and diaphragm unit 6, a switch 7 adapted to be actuated by the diaphragm 6, and an adjustable spring 8 for varying the calibration of the diaphragm 6. In use, air is supplied to the conduit 1 from a compressed air line or by means of a low pressure air blower. The restricted orifice 2 limits the volume rate of flow through the line or conduit 3, the variable orifice 2 being preferably accomplished by the use of a small needle valve. As air flows through the line or conduit 3, under virtually no pressure, into the material storage hopper 4, as when the level of material within the hopper is at the level of the lower of the two dotted lines, the diaphragm 6 will be vented through the pipe or lead 5 so that the diaphragm 6 and the switch 7 are biased to a normal position by means of the spring 8. As material is fed into the storage hopper 4, the junction of the conduit 3 with the hopper 4 is closed off by the material causing a build-up of pressure within the line 3. This pressure build-up is transmitted through the tube or lead 5 to the diaphragm 6. When the pressure builds up to a sufficient extent to overcome the force of the spring 8, the diaphragm 6 is forced outward by the pressure to effect actuation of the electric precision switch 7. The switch 7 is preferably of the type generally known as a micro switch and requires only a limited amount of movement for actuation thereof. The switch 7 may be included in a circuit to control the operation of signal lights, audible signals, additional electric controllers for operating close-off gates, valves, feeders and the like. As material is fed out of the storage hopper 4, the junction of the line or conduit 3 with the hopper 4 is again opened so that the pressure in the line 3 is relieved allowing the diaphragm 6 and the switch 7 to return to their normal positions under the resilient urge of the spring 8.

The nature of the material within the hopper 4 will determine the rate of air flow required through the line 3. According to the nature of the material in the hopper, the variable restriction 2 and the adjustable diaphragm spring 8 may be so adjusted as to insure actuation of the diaphragm 6 when the material in the hopper rises above the level of the juncture of the line 3 and the hopper 4.

The device of the present invention is adapted for determining and controlling the level of solid materials within storage hoppers or the like. Examples of solid materials with which the present invention may be utilized are sand, grain, pulverized coal, shot and the like. In actuality, the device of the present invention is adapted for utilization with solid materials of any character that will not be affected by air and will present at least sufficient restriction to the passage of air to accommodate a pressure build-up in the diaphragm unit 6. While the present invention has particular adaptability for use with solid materials, it will be apparent that same may be utilized also with storage containers for liquids, provided that the restricted orifice 2 and the diaphragm 6 and associated apparatus be disposed above the highest possible level of liquid within the container.

Solid materials of an abrasive, corrosive, or sticky nature will not affect the control device of the present invention, since there are no moving parts of the device in contact with the material. Vibration and shock will not effect false actuation of the device and the diaphragm 6 is isolated from contact with the material. The line or conduit 3 is self-cleaning by virtue of the fact that should some foreign object or a build-up of material itself cause a completely impermeable plug at the opening of the line 3 into the hopper 4, the pressure in the line 3 will build up to the pressure of the supply air, thus providing sufficient force to clean the blocked orifice. When the supply of air to the device of the present invention is compressed air, the diaphragm is preferably protected against rupture by means of a back-up plate 9 or a safety valve 10, or both.

From the foregoing, it will be appreciated that the control device of the present invention provides means for sensing and indicating and/or remedying variations in level of material in a hopper or the like to either side of a predetermined level. By utilizing two or more of the devices of the present invention, high, low and intermediate levels may be established. Referring to Figure 2, for example, a pair of control devices of the present invention, indicated generally at A and B, may be associated with a hopper 14. The hopper 14 may suitably be of the type including a cylindrical reservoir portion 16, a frusto-conical tapered portion 17, and an outlet neck 18. A conventional valve 19 may be suitably associated with the neck 18 of the hopper 14 to control the flow of material through the outlet. The control devices A and B may be utilized to determine the limits of a desired material level within the hopper 14. By way of example, it may be assumed that a desired level of material within the hopper is a level approximately the same as the juncture of the conical portion 17 and the cylindrical portion 16 of the hopper. Accordingly, the control device A is mounted to one side of that level and the control device B is located at the opposite side of that level. Then, material may be added to the hopper so that a constant level is maintained somewhere between the two control devices, which level may be readily indicated by associating appropriate indicating lights, or the like, with the units A and B or by utilizing the unit B to control admission of materials to the hopper and by utilizing the unit A to effect cessation of additional materials to the hopper. In the foregoing, the obvious assumption is that material to be admitted to the hopper 14 is under the control of the devices A and B. Assume, for example, a different situation, wherein material is constantly fed to the hopper 14 and the purpose of the control devices A and B is to discharge a predetermined quantity of material from the hopper 14. To accomplish this, the control devices A and B would be utilized to effect actuation of the valve 19 of the hopper. By way of example, consider the level of the material as lying somewhere between the two devices A and B and that material is being constantly fed into the hopper 14. As the material level rises to the control unit A, the control unit A may be utilized to actuate the valve 19 to open same so as to accommodate the discharge of material from the hopper. As the material level fell to the level of the control unit B, the control unit B could be utilized to close the valve 19. Thereafter, material would be added to the hopper unit the level again reached the control unit A, at which time the cycle would be repeated so that predetermined quantities of material could be discharged from the hopper 14. Other uses and advantages of the control units of the present invention will readily present themselves to those skilled in the art.

Referring now to Figure 3, the control devices A and B are shown in greater detail. Each unit preferably includes an inlet nipple 21, corresponding to the inlet conduit 1 of Figure 1, a needle point valve 22, corresponding to the variable restriction 2 of Figure 1, a conduit 23, corresponding to the conduit 3 of Figure 1, a conduit or lead 25, corresponding to the lead 5 of Figure 1, leading to an assembly unit 26 of conventional construction including a diaphragm, a switch and adjustable spring means for varying the calibration of the diaphragm. The inlet conduit preferably comprises the nipple 21 and a flexible hose or the like 30. The conduit or line 23 preferably comprises a reducing T 32, a nipple 34, a female union 36 and a mounting boss 38. The mounting boss 38 is preferably tubular in form and is provided at its outer end with a reduced end extension adapted to be inserted within an aperture provided in the wall 16 or 17 of the hopper 14. The mounting boss by the nature of its design is adapted to be mounted easily on any hopper or bin. As it would not be desirable to produce a special mounting boss for each hopper and as it would not be desirable to have a mounting boss in which the air inlet pointed in an upward direction, the boss of the present invention is preferably provided with an inclined end face, inclined at approximately 45° to the axis of the boss, and a parallel inclined shoulder around the reduced end extension of the boss. In hoppers whose sides vary from a vertical to a 45° slope, this boss will introduce the air from 45° downward in the first case to horizontal in the second case. As hoppers whose sides slope less than 45° from the horizontal are rare this design is entirely satisfactory. To align the boss accurately, the boss is provided with the reduced end extension or tenon adapted to enter into a hole which may be cut in the hopper wall with a hole saw. The boss, therefore, may easily be held in an accurate mounting position while it is secured to the wall of the hopper 14, suitably by welding or the like. The conduit or lead 25 preferably comprises a small pipe 40 secured to the reducing T 32 and a flexible hose 42 establishing communication between the pipe 40 and the interior of the assembly unit 26. The unit A indicates one form in which the control device of the present invention may be formed wherein the control assembly 26 is associated with the remainder of the control device by means of a bracket 44 securing the assembly 26 to the nipple 34, and wherein the boss 38 is secured to the vertical wall of the hopper at an angle of approximately 45° to direct the air stream downwardly into the hopper. The control unit B differs from the control unit A, in that the air stream conduit is disposed horizontally, rather than on an inclination, since it is secured to the sloping part of the hopper, and the control assembly 26 is supported with respect to the air stream conduit by means of a bracket 46 suitably secured to the wall 17 of the hopper. It will be appreciated, however, that the details of assembly of the control assembly 26 with respect to the air stream conduit may be varied as desired, as required for any particular installation, and that the disposition of the air stream conduit with respect to the hopper may also be varied.

From the foregoing, it will be appreciated that the present invention provides improved control means of economical manufacture and assembly adapted to sense variations in material level within a hopper or other like container. The device of the present invention has several advantages among which are: the ability of the device to be utilized with materials of substantially any nature; the disposition of all operating parts of the apparatus outside of the path of communication or flow of the material whose level is to be sensed; the insurance of practical and continued operation of the device despite use with abrasive, corrosive or sticky materials; and the economy of manufacture and assembly of the device.

While we have described what we regard to be preferred embodiments of our invention, it will be apparent that various changes, rearrangements and modifications may be made therein without departing from the scope of the invention, as defined by the appended claims.

We claim:

1. A device for sensing material within a hopper or the like, comprising an inlet nipple adapted for attachment to an air hose at one end thereof, a needle valve connected at its inlet side to the opposite end of said nipple, a reducing T connected at one end thereof to the outlet side of said needle valve, an outlet conduit communicating at one end thereof with the opposite end of said reducing T, said outlet conduit at the opposite end thereof being formed for connection to a wall of a hopper to communicate with the interior of the hopper, a control assembly carried by said outlet conduit, said control assembly comprising pressure responsive means and a control device adapted to be actuated by said means, and a conduit connected to the T of said reducing T and establishing communication between said reducing T and said pressure responsive means.

2. A device as set forth in claim 1, including a bracket mounting said control assembly on said outlet conduit, said outlet conduit being adapted to be secured to the wall of the hopper to support said device on the hopper.

3. A device as set forth in claim 1, including a bracket connected to said control assembly and extending generally parallel to said outlet conduit, said bracket being adapted to be secured to the wall of the hopper to support said device on the hopper.

4. A device for sensing material within a hopper or the like, comprising an inlet nipple adapted for attachment to an air hose at one end thereof, a needle valve body connected at its inlet side to the opposite end of said nipple, a needle valve adjustable in said valve body, a reducing T connected at one end thereof to the outlet side of said valve body, an outlet conduit communicating at one end thereof with the opposite end of said reducing T, an outlet boss connected to the opposite end of said outlet conduit, said outlet boss at the free outlet end thereof having an inclined end face and a reduced tenon projecting from said face, said tenon being adapted to be positioned in a hole in a wall of a hopper with the inclined face thereof engaging the wall of the hopper to establish communication between said outlet conduit and the interior of the hopper, a control assembly carried by said outlet conduit, said control assembly comprising a diaphragm, adjustable spring means acting on said diaphragm and accommodating calibration of said diaphragm and a control device adapted to be actuated by said diaphragm, and a conduit connected to the T of said reducing T and establishing communication between said reducing T and said diaphragm.

References Cited in the file of this patent

UNITED STATES PATENTS

| | | |
|---|---|---|
| 1,631,024 | Fisher | May 31, 1927 |
| 1,977,969 | McIntosh | Oct. 23, 1934 |
| 2,331,208 | Ludi | Oct. 5, 1943 |
| 2,373,292 | Clason | Apr. 10, 1945 |
| 2,640,977 | Parisi | June 2, 1953 |